United States Patent [19]
Sato

[11] Patent Number: 5,247,849
[45] Date of Patent: Sep. 28, 1993

[54] SHIFT LEVER CONSTRUCTION

[75] Inventor: Yasuhiro Sato, Tokyo, Japan
[73] Assignee: Niles Parts Co., Ltd., Japan
[21] Appl. No.: 849,622
[22] Filed: Mar. 10, 1992
[51] Int. Cl.$^5$ .................. B60K 20/00; G05G 1/00; H01B 7/00
[52] U.S. Cl. ............................ 74/475; 74/538; 200/61.88; 307/10.1
[58] Field of Search ........... 74/475, 536, 538, 110; 200/61.88, 341, 345; 307/10.1; 192/3.62

[56] References Cited

U.S. PATENT DOCUMENTS

| | | | |
|---|---|---|---|
| 1,771,907 | 7/1930 | Abramson | 74/110 X |
| 3,309,487 | 3/1967 | Fisher | 200/345 |
| 3,998,109 | 12/1976 | O'Brien | 74/538 X |
| 4,450,332 | 5/1984 | Stamm et al. | 200/345 |
| 4,451,719 | 5/1984 | Lauterburg et al. | 200/345 |
| 4,774,850 | 10/1988 | Shovlin | 74/538 X |
| 4,822,962 | 4/1989 | MacCourt | 200/61.88 |
| 4,831,278 | 5/1989 | Ueda et al. | 307/10.1 |
| 4,965,420 | 10/1990 | Phillips et al. | 200/341 |

FOREIGN PATENT DOCUMENTS

| | | | |
|---|---|---|---|
| 172024 | 9/1984 | Japan | 74/538 |
| 61-45534 | 12/1986 | Japan . | |
| 80844 | 3/1990 | Japan | 74/475 |

Primary Examiner—Rodney H. Bonck
Attorney, Agent, or Firm—Ronald P. Kananen

[57] ABSTRACT

A shift lever construction for use in vehicles having automatic transmissions is described. This construction facilitates electrical wiring in the shift lever as well as providing a sophisticated core structure of the shift lever. The shift lever is pivotally supported by the vehicle body and has a knob for housing a push button which unlocks the lock mechanism of the shift lever. The shift lever has electrically conductive leads connected with a switch mounted in the knob. The shift lever is provided with a rod for unlocking the lock mechanism when pushed by the push button. The core is precisely molded through the use of combined mold tools which provide accurate positioning between the push button and the rod.

9 Claims, 8 Drawing Sheets

SHIFT LEVER CONSTRUCTION

FIELD OF THE INVENTION

The present invention relates to the construction of shift levers used for vehicles having automatic transmissions.

BACKGROUND OF THE INVENTION

Figure 16:
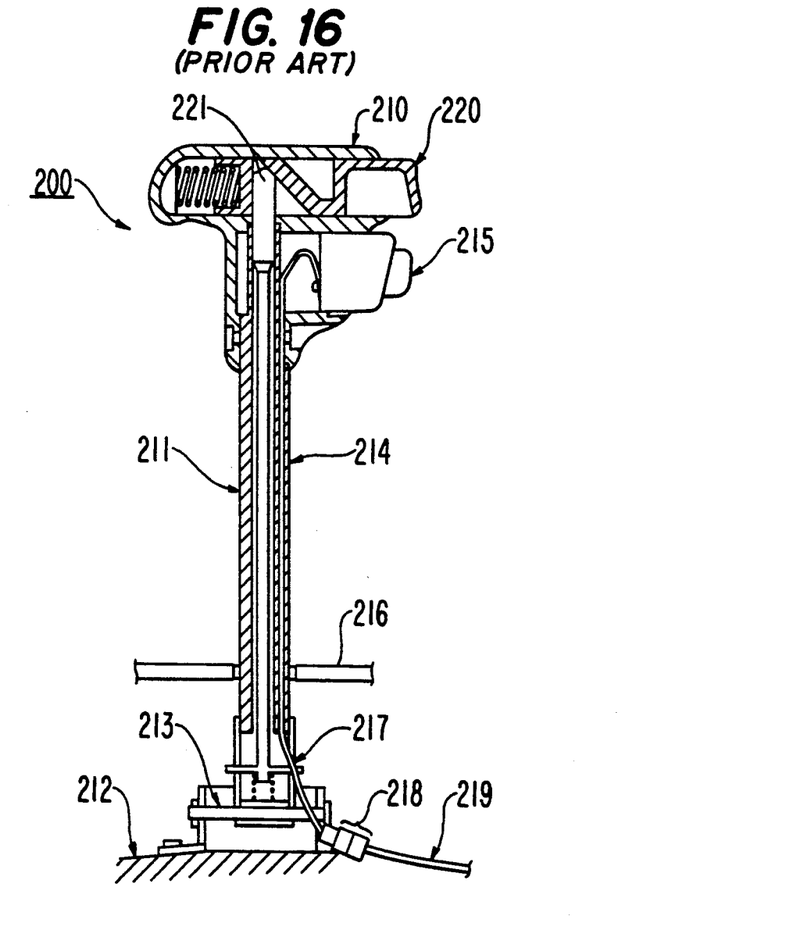
FIG. 16 is a cross-sectional view showing a prior art shift lever.

FIGS. 16-18 illustrate two prior art shift levers. In FIG. 16, a prior art shift lever 200 is provided with a tapered push button 220 having a knob 210 made of resin or the like. The push button 220 is slidably mounted in the knob 210 of the shift lever 200. The knob 210 is mounted on the upper end portion of an outer cover 211 which is pivotable about a shaft 213 relative to the vehicle body 212. Depressing the push button 220 causes the tapered portion of the push button 220 to push down the upper end of a rod 221 in the outer cover 211, so that the shift lever 200 is pivoted. The knob 210 also has a switch 215 which is primarily used for switching on and off the control for "overdrive." An upwardly extending space 214 is provided within the outer cover 211 through which a harness 219 below an indicator cover 216 on the vehicle body side is electrically connected to the switch 215. A cord 217 having one end connected with the switch 215 runs through the space 214. The cord 217 is thus directed to the lower end of outer cover 211 where it is connected with the harness 219 via a coupler 218.

With the aforementioned prior art shift lever construction, a space is required in the knob 210 where the cord 217 is connected with the switch 215 and another space 214 is required which allows the cord 217 to run within the outer cover 211. It is difficult, time-consuming work to insert the cord 217 into the space 214 and to also electrically connect the cord 217 with the switch 215.

Figure 17:
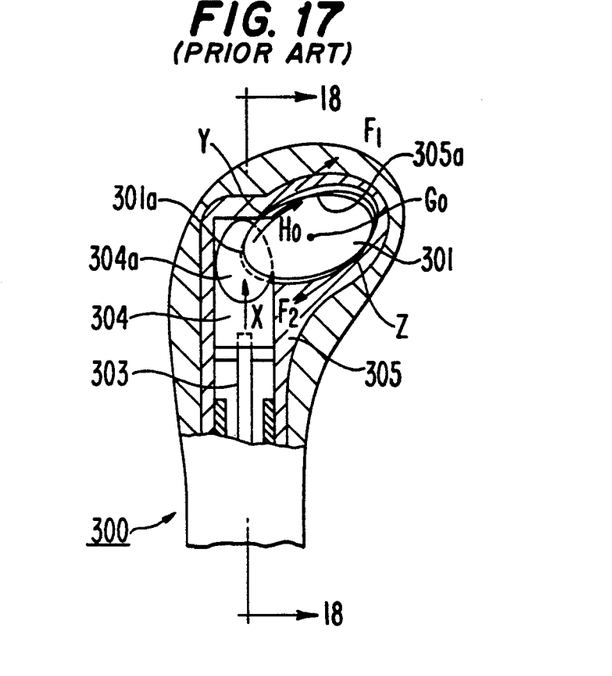
FIG. 17 is a cross-sectional side view of an essential part of another prior art shift lever.
Figure 18:
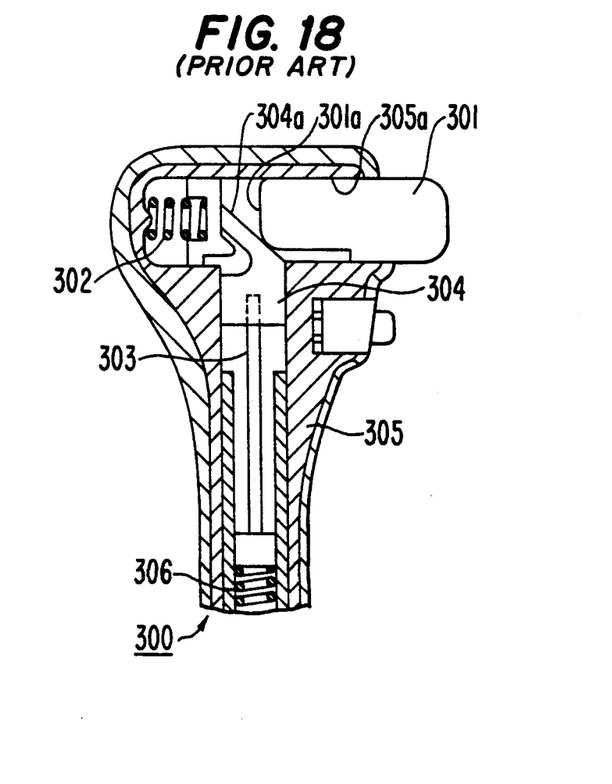
FIG. 18 is a cross-sectional view taken along the lines F—F of FIG. 17.

FIGS. 17 and 18 show another prior art construction of a shift lever. This shift lever 300 has a push button 301 whose axial center $G_o$ is not intercepted by the axis of a rod 303. The push button 301 is essentially a cylinder-shaped column having a substantially elliptic cross section. When a pressing portion 301a is pressed away from the center $G_o$, the push button 30 engages a force transmitting block 304 secured to the rod 303. Depressing the push button 301 causes the pressing portion 301a to push a beveled surface 304a of the force transmitting block 304, which in turn presses the rod 303 in a downward direction. At the same time, the push button 301 receives the reaction of the force transmitting block 304 in the direction of an arrow X, so that a rotational force is exerted on the push button 301 in the direction of an arrow $H_o$. Note that there is a small clearance between the push button 301 and a hollow space 305a of a core 305 that holds the push button 301. Therefore, when the push button 301 is rotated by the aforementioned rotational force, the push button 301 abuts the core 305 at points Y and Z in the hollow space 305a where forces act in the directions of arrows F1 and F2, respectively. The push button 301 therefore experiences a large resistance when it slides along the wall of the hollow space 305a, so that the push button 301 does not move smoothly and may not return to its home position due to insufficient urging forces of springs 302 and 306.

SUMMARY OF THE INVENTION

In view of the foregoing, it is an overall object of the present invention to overcome these and other drawbacks of the prior art. Specifically, it is one object of the invention to provide a shift lever having a simplified construction, allowing an electrical connection to be made without difficulty between a switch near the knob of the shift lever and a harness on the vehicle body side.

A further object of the invention is to provide an improved push button, which automatically returns to the home position, and to prevent the push button from being caught in the hollow space of a core which supports the push button within the core.

A further object of the invention is to provide an accurately positioned hollow space for housing the push button and an accurately positioned axial space through which a rod is inserted, as well as to provide smooth walls for the hollow and axial spaces.

A further object of the invention is to prevent undesirable sounds due to vibrations of the push button and to prevent dust and foreign materials from entering into the interior of the knob of the shift lever.

A further object of the invention is to provide a vibration-resistant shift lever construction where the repulsive force of a resilient member that urges the push button toward the opening of a hollow space is effectively dispersed toward the wall of the hollow space, thereby pressing the push button against the wall of the hollow space with an optimum pressure to prevent undesirable push button sounds and to provide a smooth sliding motion of the push button within the hollow space.

BRIEF DESCRIPTION OF THE DRAWINGS

Features and other objects of the invention will be more apparent from the detailed description of the preferred embodiments with reference to the accompanying drawings in which.

DETAILED DESCRIPTION OF THE PREFERRED EMBODIMENTS

Figure 1:
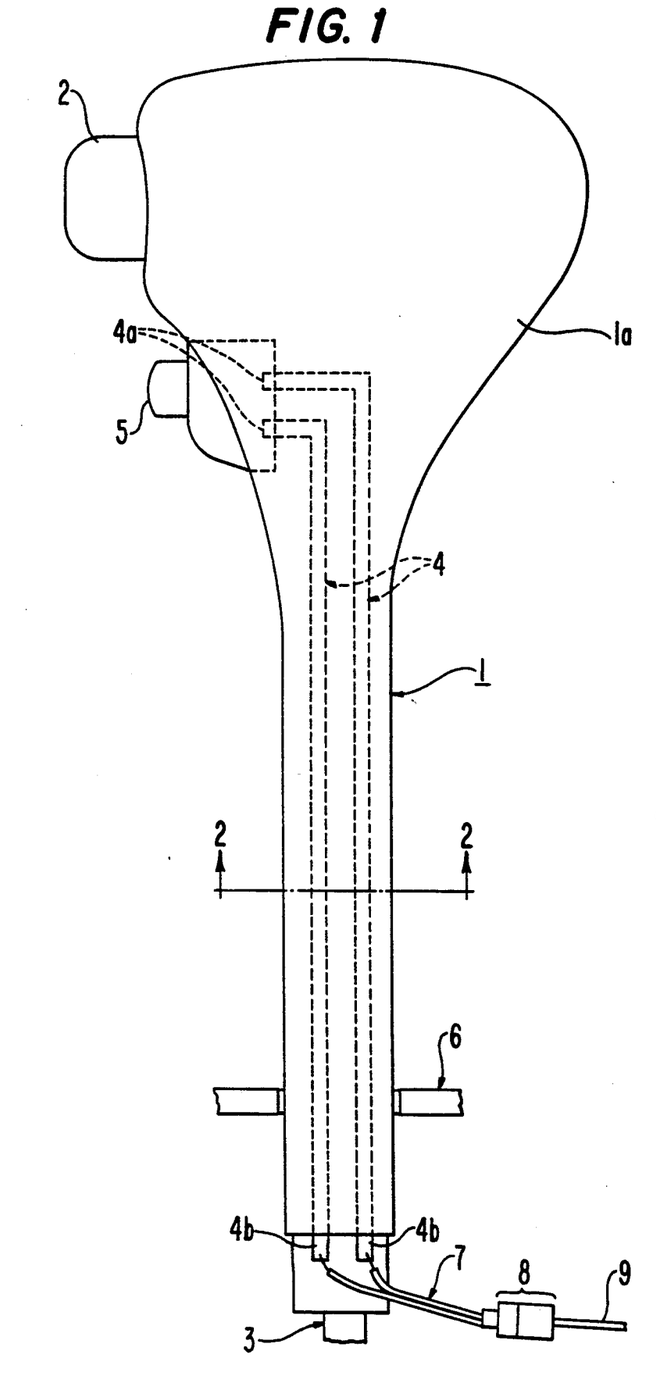
FIG. 1 is a side view of an embodiment of a shift lever according to the present invention.
Figure 2:
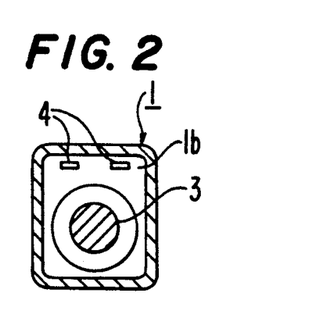
FIG. 2 is a cross-sectional view taken along the lines A—A of FIG. 1.

FIG. 1 is a side view of an embodiment of a shift lever according to the invention and FIG. 2 is a cross-sectional view taken along the lines A—A of FIG. 1. In these figures, a knob 1a of a shift lever 1 is molded from resin or a like material and has a push button 2. The shift lever 1 extends downwardly below an indicator cover 6. A shaft 3 vertically extends through the middle of a core 1b of the shift lever 1 as shown in FIG. 2. Electrically conductive leads 4 are integrally molded with the core 1b and are exposed at their upper end portions within the knob 1a and at their lower end portions below the indicator cover 6.

The electrical connection between a switch 5 on the knob side and a harness 9 on the vehicle body side is as follows. One end 4a of each of the leads 4 is respectively inserted into the associated terminals of the switch 5. The other end 4b of each of the leads is, for example, respectively soldered to cords 7 which are connected with the harness 9 via a coupler 8.

Figure 3:
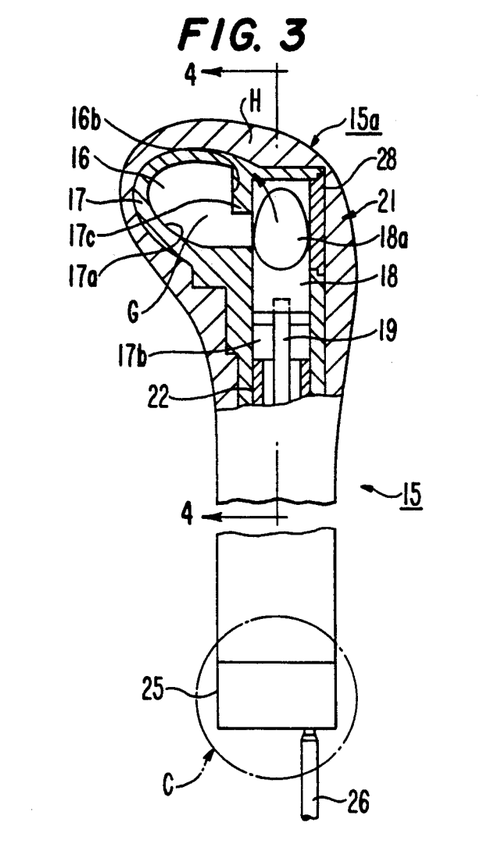
FIG. 3 is a cross-sectional side view of an essential part of another embodiment of the invention.
Figure 4:
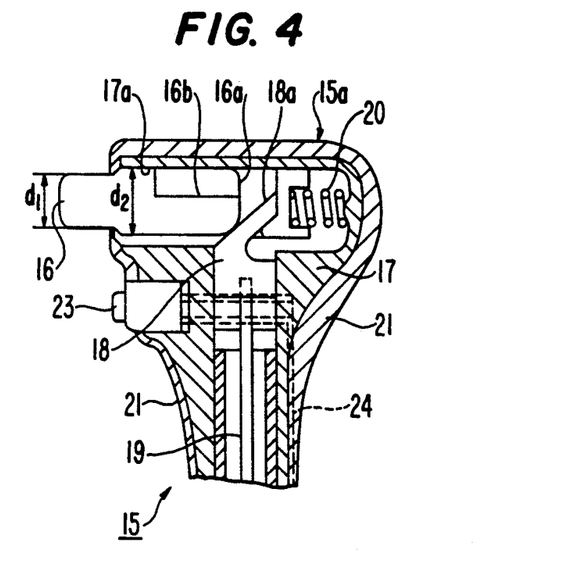
FIG. 4 is a cross-sectional view taken along the lines B—B of FIG. 3.
Figure 5:
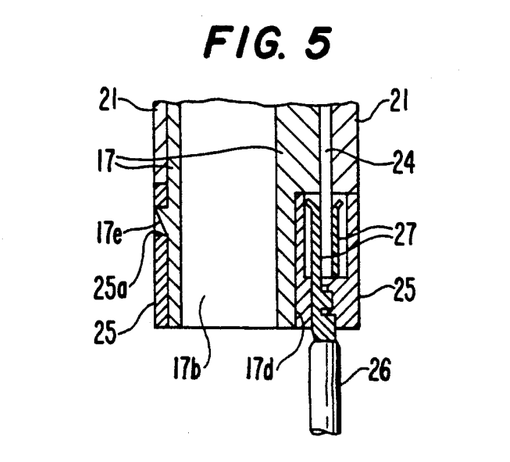
FIG. 5 is an enlarged cross-sectional view of portion C of FIG. 3.

FIGS. 3-5 show another embodiment of the invention. In these figures, a shift lever 15 has a knob 15a on an upper end portion thereof. A core 17 molded from a hard resin has an outer shell 21 molded from soft resin. The outer shell 21 is integrally molded with the core 17 to form a shift lever 15. A pipe-like support 22 may be fitted, as required, to the lower end portion of the core 17 such that the support 22 projects downwardly through the shift lever 15. The knob 15a has a hollow space 17a extending transversely to the core 17 with an opening. A push button 16, having a substantially elliptic cross section, is retractably and slidably held within the hollow space 17a. The core 17 has an axial space 17b through which a rod 19 extends. Depressing the push button 16 causes the rod 19 to move in a downward direction to unlock a shift lever locking mechanism (not shown). The push button 16 engages a force transmitting block 18 secured to an end portion of the rod 19. A pressing portion 16a, which is formed by cutting away part of the push button 16, engages the beveled surface 18a of a force transmitting block 18 to depress the rod 19 downwardly. A resilient member 20 takes the form of, for example, a spring that urges the push button 16 against the opening of hollow space 17a.

As shown in FIG. 4, the diameter d1 of the opening of outer shell 21 is selected to be slightly smaller than the maximum diameter d2 of the push button 16. Thus, the spring 20 urges the push button 16 against the tapered inner surface of the opening of the outer shell 21, so that the push button 16 is properly held by the tapered inner surface of the opening 21 and makes no undesirable sounds when exposed to vibration. The tapered surface of the opening of the outer shell 21 is rather soft and permits the push button 16 to be press-fitted into the hollow space 17a. The push button 16 has an L-shaped cutout 16b which engages a stopper 17c projecting into the inner space 17a.

A switch 23 is fitted to the core 17 through the knob 15a. Leads 24 are, for example, electrically conductive round bars which are molded with or fitted to the core 17. The leads 24 have one end thereof fitted to the switch 23 and the other end projecting downwardly through the shift lever 15. A connector 25 is inserted into a fitting 17d at the lower end of the core 17 and has a terminal 27 crimped to the cord 26 as shown in FIG. 5. The connector 25 is formed with a fastening opening 25a therein which engages a flange 17e formed on the fitting 17d of the core 17. Being crimped to the cord 26, the terminal 27 is integrally molded with the connector 25. The terminal 27 then attaches to the leads 24, when the connector 25 is fitted to the core 17, providing an electrical connection.

Figure 6:
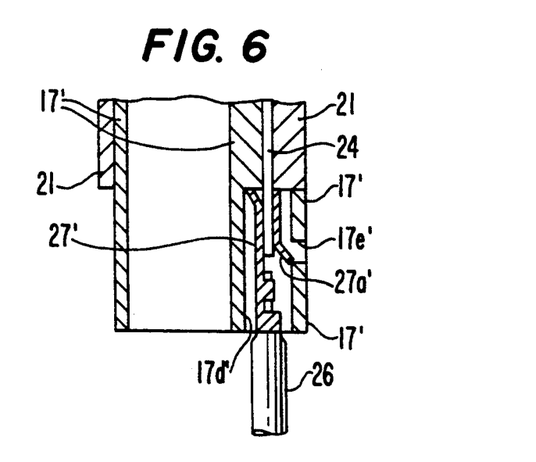
FIG. 6 is a cross-sectional view of another embodiment which is a modification of the construction of FIG. 5.

FIG. 6 shows a modification of the construction of the leads 24 and cord 26. In FIG. 6, at a lower portion of a core 17', there is provided a terminal insertion opening 17d' through which a terminal 27' is inserted. The inner wall of the terminal insertion opening 17d' is formed with a latch opening 17e' into which a projecting strap 27a' of the terminal 27' drops. The terminal 27' is crimped to the cord 26 and is pressed into the terminal insertion opening 17d' of core 17' so that the projecting strap 27a' is latched by the latch opening 17e' and the lead 24 is electrically connected with the terminal 27'.

Figure 7:
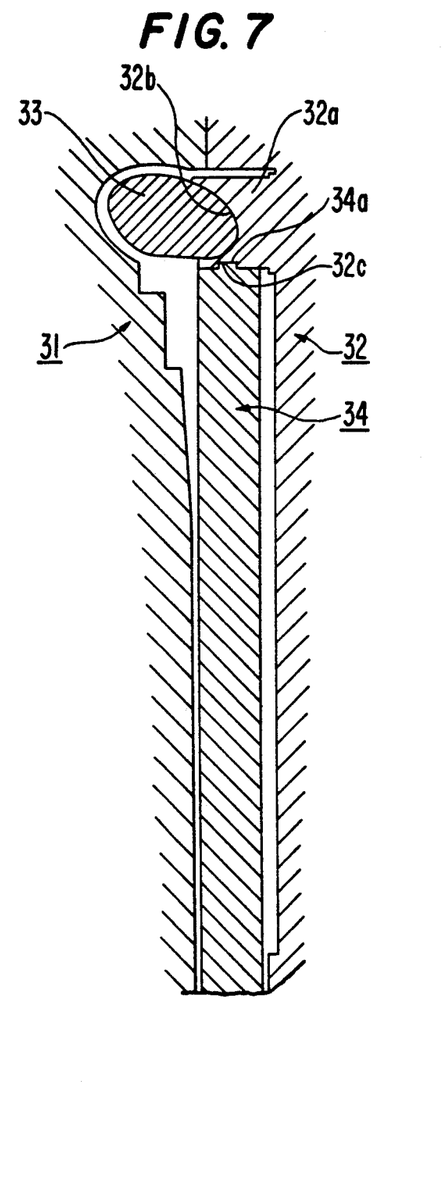
FIG. 7 is a cross-sectional view of a mold tool for molding the core of a shift lever of FIG. 3.

FIG. 7 shows the manner in which the shift lever 15 of this embodiment is molded. The core 17 is molded in the space between an upper mold tool 31 and a lower mold tool 32 that fits together with the upper mold tool 31. The lower mold tool 32 engages a pin 33 that defines the hollow space 17a of the core 17, and a projection 32a for supporting a cylindrical pin 34 which defines the axial space 17b of the core 17.

The projection 32a defines a curvature 32b that mates with the pin 33 having a generally elliptic cross section, and a recess 32c which mates with a projection 34a at the tip end of pin 34.

When molding the core 17, the upper mold tool 31 is properly positioned relative to the lower mold tool 32. Then, the pin 33 is inserted so as to fit to the curvature 32b of the lower mold tool 32. In this manner, the pin 33 is accurately held in position within the mold tool.

Then, the pin 34 is inserted into the mold tool such that the projection 34a at the tip end fits into the recess 32c formed in the projection 32a. In this manner, the pin 34 may be accurately held in position within the mold tool so that the axial opening 17b of the core 17 may be formed to have a smooth surface.

Figure 8:
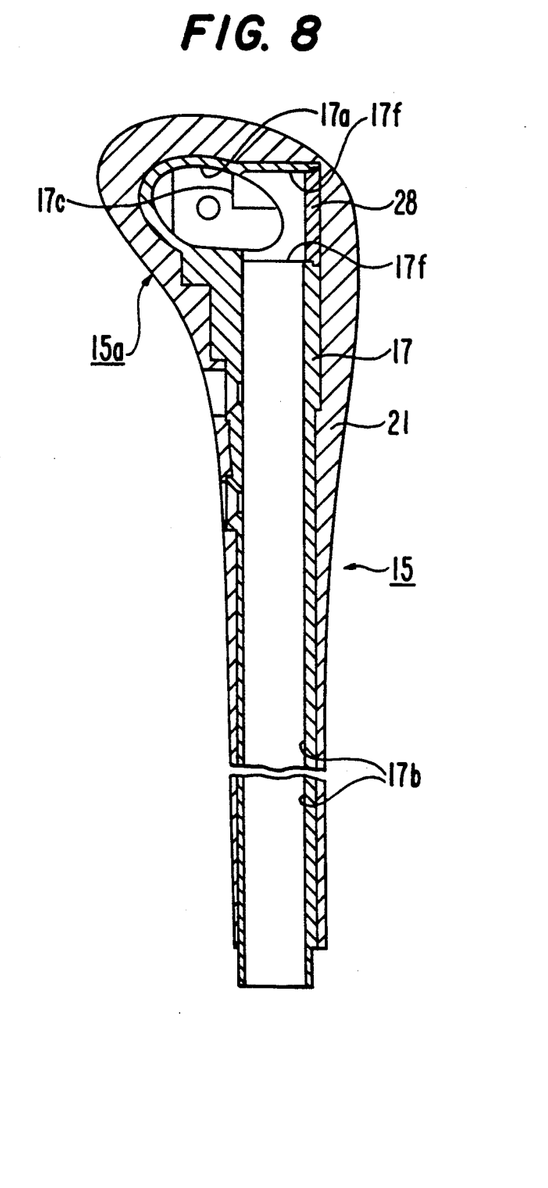
FIG. 8 is a cross-sectional view of the outer shell that defines the core of the shift lever molded from the mold tool in FIG. 7.

As shown in FIG. 8, a lid 28 is then attached to the now-molded core 17 to close a lateral opening 17f therein which is communicated with the hollow space 17a formed by the projection 32a. Then, the core 17 is covered with the outer shell 21 to form a shift lever 5. The lid 28 is embedded in the outer shell 21.

The operation of the present invention of the aforementioned construction is described as follows. Referring to FIGS. 3 and 4, when the push button 16 is depressed, the push button 16 pushes the beveled surface 18a of the transmitting block 18 so as to drive the transmitting block 18 and the rod 19 in a downward direction. At the same time, a reaction force from the transmitting block 18 acts on the outer surface of the push button 16 so that the push button 16 experiences a rotational force. This rotational force tends to drive the push button 16 into rotation about point G in the direction of arrow H. However, the stopper 17c engages a cutout 16b of the push button 16 to prevent the push button 16 from rotating. Thus, since the push button 16 does not rotate, it is not engaged by the wall of the space 17a. This allows the push button 16 to smoothly return to its home position.

Referring to FIG. 5, the terminal 27 fits to the lead 24 of switch 23 to electrically connect the cord 26 with the lead 24 when the connector 25 is fitted into the fitting portion 17d at the lower end of the core 17 This is advantageous in making an electrical connection between the cord 26 and the lead 24. The terminal 27 is housed in the connector 25 which protects the terminal 27 from deformation due to external forces.

In FIG. 6, the terminal 27' is pressed into the terminal insertion opening 17d' of the core 17' to thereby connect the lead 24 with the cord 26. The terminal insertion opening 17d' of core 17' protects the terminal 27' housed therein from deformation due to external forces.

Figure 9:
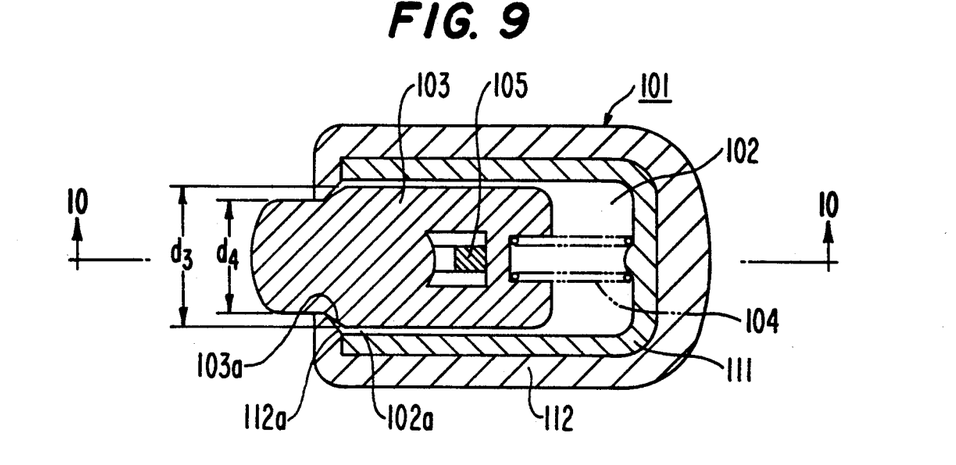
FIG. 9 is a transverse cross-sectional view of the knob of the shift lever of another embodiment of the invention.
Figure 10:
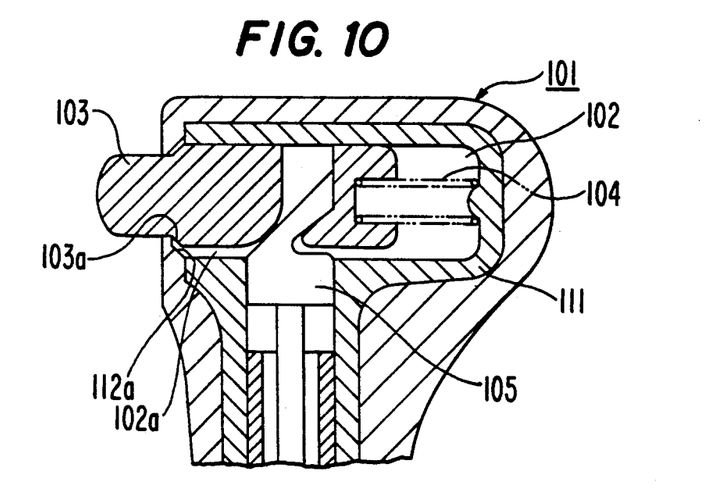
FIG. 10 is a cross-sectional view taken along the lines D—D of FIG. 9.

FIGS. 9 and 10 show another embodiment of the invention. Here, a knob 101 of a shift lever is formed with a hollow space 102 therein. A push button 103 is slidably supported in the hollow space 102, and a resilient member such as a spring 104 urges the push button 103 against an opening 102a of the hollow space 102. A rod 105 is depressed in a downward direction to unlock the lock mechanism of the shift lever (not shown) when the operator operates the push button 103.

The construction of this embodiment will now be described in detail. The knob 101 is constructed from a core 111 and an outer shell 112. The core 111 is molded from a hard resin, while the outer shell 112 is molded from a soft resin, such as vinyl chloride. It should be noted that the opening of outer shell 112 has a diameter d4 slightly smaller than the maximum diameter d3 of the push button 103. Thus, when the push button 103 is not operated by the operator, the tapered surface 103a is urged by the spring 104 toward the opening 102a to abut the tapered surface 112a of the outer shell 112. In this manner, when the push button 103 is not operated, it is properly held by the tapered surface 112a, and is prevented from making undesirable sounds due to its own vibration. The push button 103 may be press-fitted into the opening 102a since the tapered surface 112a is soft.

Figure 11:
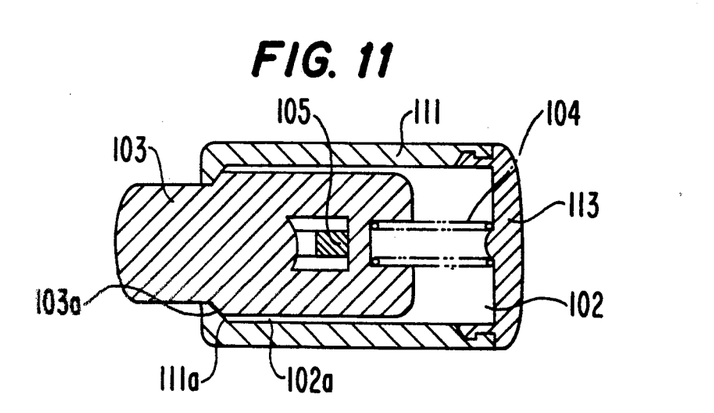
FIG. 11 is a cross-sectional view of another embodiment which is a modification of the construction of FIG. 9.

As shown in FIG. 11, the construction of the embodiment of FIGS. 9 and 10 may be modified so that the tapered surface 111a is an extension of the core 111. In this instance, the core 111 is hard and therefore the push button 103 cannot be pressed into the opening 102a. Thus, the push button 103 is inserted into the hollow space 102 from the rear side as shown in FIG. 11, and a rear lid 113 is then fitted into the hollow space 102.

Figure 12:
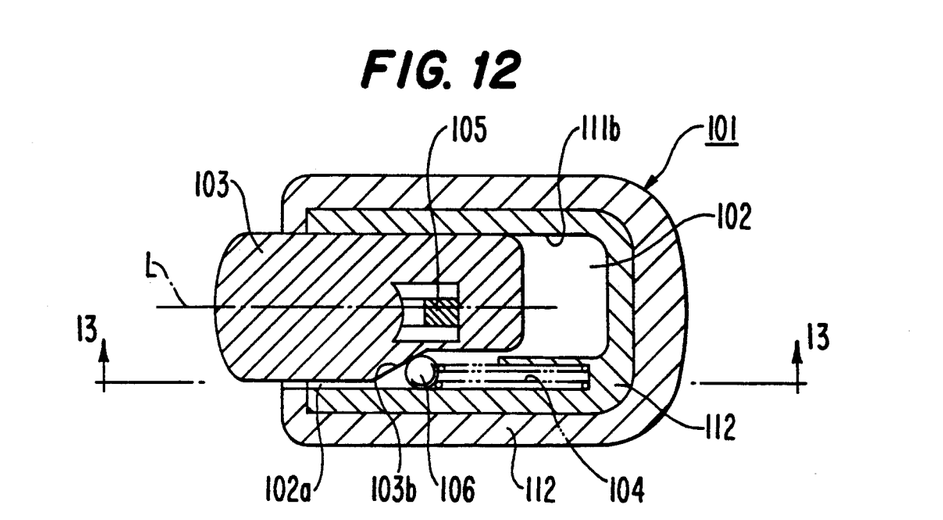
FIG. 12 is a transverse cross-sectional view of the knob of the shift lever of another embodiment of the invention.
Figure 13:
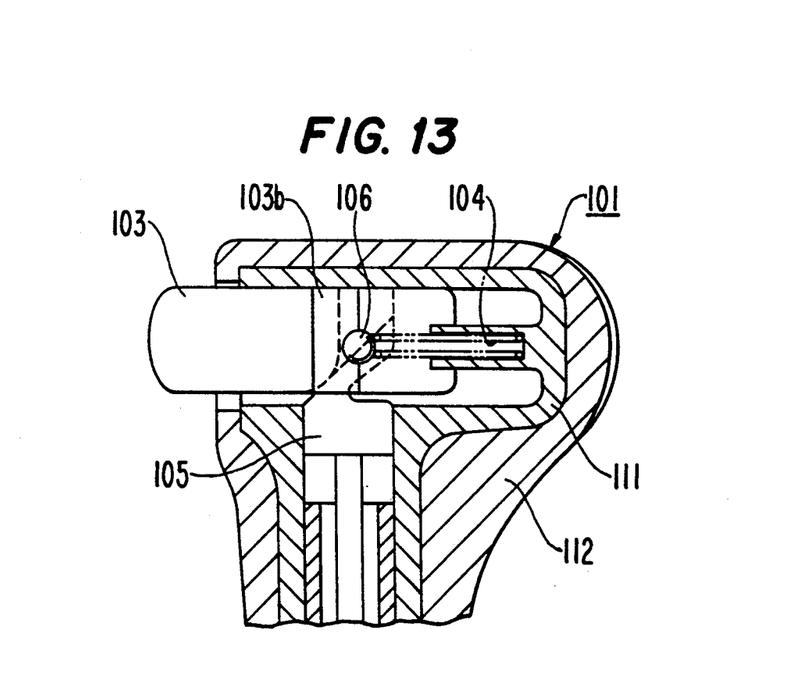
FIG. 13 is a cross-sectional view taken along the lines E—E of FIG. 12.

FIGS. 12 and 13 show another embodiment of the invention. In these figures, elements similar to those in the embodiments of FIGS. 9 to 11 have been given the same reference numerals and only these elements differing in construction from the embodiment of FIGS. 9 to 11 will be described.

Here, the resilient member such as the spring 104 is positioned offset relative to an axis L of the sliding movement of push button 103 (i.e., it is not in line with the push button). The push button 103 has a tapered surface 103b which contacts the spring 104. A steel ball 106 is placed between the tapered surface 103b of the push button 103 and the spring 104 where it effectively resolves the repulsive force of the spring 104 into a depressive force that presses the push button toward the inner wall 111b of the core 111 and a force that urges the push button 103 toward the opening 102a. The steel ball 106 also helps the push button 103 to slide smoothly. In this arrangement, the push button 103 is properly pressed against the inner wall 111b where it is held in position, preventing undesirable vibration sounds of the push button 103.

The slope of the tapered surface 103b of the push button 103 may be varied to adjust the depressive force of the push button 103 against the inner wall 111b of the core 111. Furthermore, the steel ball 106 may be of other shapes, such as the head of a bullet, or may be omitted.

Figure 14:
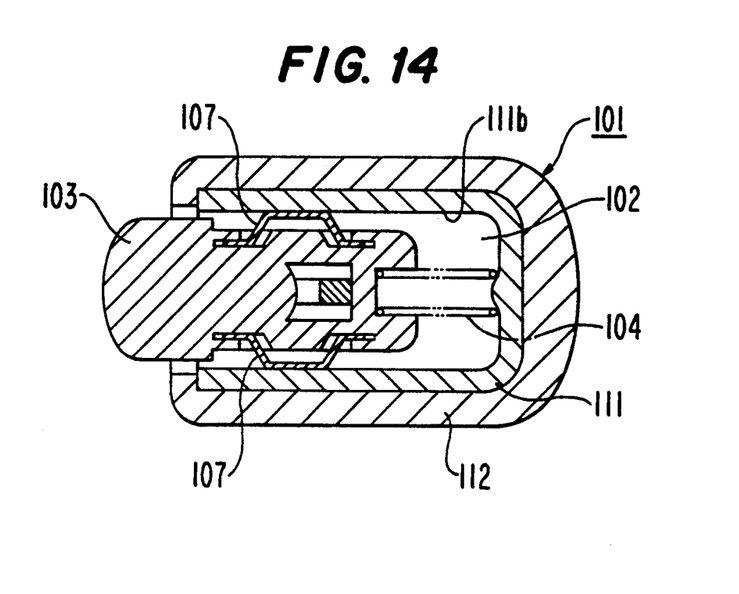
FIG. 14 is a transverse cross-sectional view of the knob of the shift lever of another embodiment of the invention.

FIG. 14 shows another embodiment of the invention. In FIG. 14, elements similar to those in the embodiments of FIGS. 9 to 13 have been given the same reference numerals and are of substantially the same construction as the corresponding elements in these embodiments. Only those elements differing in construction from the embodiments of FIGS. 9 to 13 will be described. In FIG. 14, slidable contacting pieces 107 are mounted on the side walls of the push button 103. The slidable contacting pieces 107 may take the form of leaf springs which slidably abut the inner wall 111b of the core 111 so as to hold the push button 103 in the middle of the hollow space 102. Any vibration exerted on the push button 103 is damped by the slidable contacting pieces 107 so that undesirable sounds due to the vibration of push button 103 are prevented.

Figure 15:
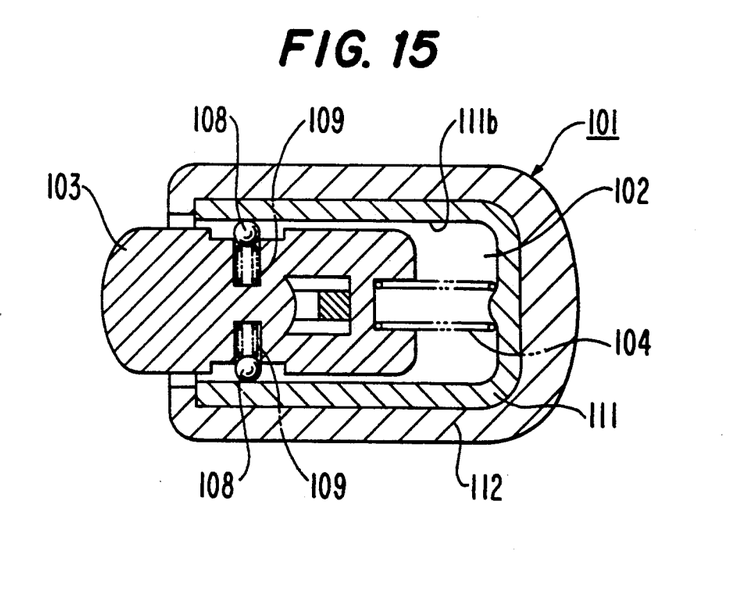
FIG. 15 is a transverse cross-sectional view showing another embodiment which is a modification of the construction in FIG. 14.

The construction of the embodiment of FIG. 14 may be modified so that the slidable contacting pieces 107 may be constructed of steel balls 108 and springs 109 as shown in FIG. 15.

Therefore, in accordance with the above embodiments, the invention provides numerous features which enhance industrial applicability. For example, conductive leads need not be wired to a shift lever, facilitating electrical connection between the switch in the shift lever knob and the harness on the vehicle body. Simple construction of the body of the shift lever knob also ensures that the shift lever remains small in size.

Moreover, in order to prevent the push button from rotating when it is pressed by the operator, the push button may be formed with a cutout groove therein while the core is formed with a complementary stopper thereon which engages the cutout groove. This prevents the push button from binding in the hollow core due to rotation and facilitates the automatic return of the push button to its home position.

Also, when molding the core of the shift lever, the projection for holding two pins that define a hollow and an axial hole, respectively, may be formed either in the upper mold tool or in the lower mold tool. This ensures accurate positioning of the hollow space and axial hole as well as smooth surfaces of the hollow space and axial hole.

Furthermore, the diameter of an opening that holds the push button may be selected to be smaller than the maximum diameter of the push button. At the same time, the wall of the hollow space that defines the opening may be formed with a tapered surface where the push button abuts the inner wall. This ensures that the wall around the opening firmly holds the push button when the push button is not operated by the operator, preventing undesirable sounds, which would otherwise occur due to the vibration of the push button, and completely closing the opening with the push button to keep out dust and foreign materials.

Moreover, a resilient member that urges the push button may be positioned such that the resilient member exerts its spring force on the push button in a direction not in line with the axis of sliding movement of push button. Further, the surface of the push button in contact with the resilient member may be tapered. This effectively resolves the repulsive force of resilient member into a force urging the push button against the opening and a force pushing the push button against the wall of the hollow space. Thus, the push button is held by a reasonable holding force, while not disturbing the sliding movement thereof. This arrangement also prevents undesirable sounds due to the vibration of the push button.

Finally, the push button may have slidable contacting pieces on the sides thereof which facilitate a sliding movement of the push button while providing an effective antivibration structure where the push button is held in the middle of the hollow.

What is claimed is:

1. A shift lever, comprising:
a molded body which includes a handle portion and a shaft portion;
a switch mounted in the handle portion; and
two electrically conductive bars which are integrally molded in the body of said shift lever, said bars each having a first end and a second end, the first ends of said bars being connected with said switch, and the second ends of said bars being connected with a harness from a vehicle body.

2. A shift lever as set forth in claim 1, wherein said handle portion includes:
a hollow space;
a push button housed in said hollow space, said push button having a cut-out groove formed therein; and
a stopper projecting from a wall of said core into said hollow space, said stopper being rigidly integral with said wall and engaging said cut-out groove such that said stopper prevents said push button from rotating in said hollow space.

3. A shift lever as set forth in claim 1, wherein said shaft portion includes an axial space through which a rod extends and said handle portion includes a hollow space in which a push button is disposed so as to be reciprocal along an axis;
a lateral opening extending transversely to said axial space and essentially parallel with the axis along which said push button is reciprocal, said lateral opening communicating with said hollow space; and
a lid disposed with said lateral opening such that said lid closes said lateral opening.

4. A shift lever as set forth in claim 1, wherein said handle portion has a hollow space therein in which an opening is formed, and which further comprises:
a push button slidably disposed within said hollow space so as to be slidable along an axis, said push button having a portion which projects outwardly from said hollow space through said opening; and
a resilient member for urging said push button toward said opening, said resilient member being arranged essentially parallel with and offset relative to the axis along which said button is slidable; and wherein a wall portion defining said opening and said push button both have tapered surfaces, said resilient member urging said tapered surfaces into contact with each other.

5. A shift lever as set forth in claim 4 wherein said push button being arranged to be reciprocal in a direction which extends laterally with respect to the axial direction of said shaft portion;
a reciprocal rod disposed in said shaft portion, said rod being arranged to be reciprocal along an axis which is offset with respect to the axis along which the push button is slidable;
means operatively interconnecting the push button and a top end portion of the rod for inducing the rod to reciprocate in response to reciprocation of said push button, the operative connection being such as to produce a force which tends to rotate the button about the axis along which it is slidable when reciprocal movement of the button induces reciprocal motion in said rod; and
means for preventing rotation of said push button in response to said force.

6. A shift lever as set forth in claim 1, wherein said handle portion includes a knob having a hollow space in which an opening is formed, and which further comprises:
a push button having a tapered surface on an external side surface thereof, said push button being slidably disposed within said hollow space; and
a spring disposed in said hollow space for urging said push button toward said opening, said spring being offset relative to a sliding axis of said button and applying a bias to said tapered surface of said push button.

7. A shift lever, according to claim 6, wherein said resilient member is a spring and further induces a steel ball disposed between said spring and said tapered surface of said push button.

8. A shift lever as set forth in claim 1, wherein said handle portion is formed with a hollow space which has an opening and an essentially undulation free inner wall;
a push button slidably held within said hollow space and projecting in part outwardly from said hollow space through said opening, said push button having on opposing side surfaces thereof resilient members which are slidably in contact with said essentially undulation free inner wall; and
a resilient member for urging said push button toward said opening.

9. A shift lever as set forth in claim 1, wherein:
a rod is housed in said shaft portion so as to be reciprocal along a first axis;
a push button is slidably supported in said hollow portion and arranged to be reciprocal along a second axis, said push button being located with respect to said shaft portion such that the second axis of said push button is offset with respect to the first axis of said rod housed in said shaft portion;
means operatively interconnecting said push button and said rod, for inducing said rod to reciprocate in response to reciprocal movement of said push button; and
a projection which is rigid with the handle portion and which extends into the hollow portion, said push button having a recessed portion in which said projection is received, the combination of said projection and the hollow portion in said push button defining means for preventing the push button from rotating about the second axis in response to a force which is produced when reciprocation of said push button induces reciprocation of said rod.

* * * * *